United States Patent [19]

Meyer

[11] Patent Number: 5,801,903
[45] Date of Patent: Sep. 1, 1998

[54] CONTACT RECORDING SLIDER FOR USE IN A LUBRICANT CONTAINING INFORMATION STORAGE SYSTEM

[75] Inventor: Dallas W. Meyer, Rochester, Minn.

[73] Assignee: International Business Machines Corporation, Armonk, N.Y.

[21] Appl. No.: 245,518

[22] Filed: May 18, 1994

Related U.S. Application Data

[63] Continuation of Ser. No. 998,103, Dec. 29, 1992, abandoned.

[51] Int. Cl.$^6$ ................... G11B 5/60; G11B 17/02
[52] U.S. Cl. ........................................................ 360/103
[58] Field of Search .................... 360/102, 103, 360/122

[56] References Cited

U.S. PATENT DOCUMENTS

| | | | |
|---|---|---|---|
| 4,553,184 | 11/1985 | Ogishima | 360/103 |
| 4,814,922 | 3/1989 | Osanai | 360/130 |
| 4,858,043 | 8/1989 | Kadokura et al. | 360/99.01 |
| 4,974,106 | 11/1990 | White et al. | 360/102 |
| 5,052,099 | 10/1991 | Taguchi et al. | 29/603 |
| 5,065,500 | 11/1991 | Yoneda et al. | 29/603 |
| 5,079,657 | 1/1992 | Aronoff et al. | 360/103 |
| 5,134,531 | 7/1992 | Matsuzaki et al. | 360/103 |
| 5,193,046 | 3/1993 | Lemke et al. | 360/102 |
| 5,200,867 | 4/1993 | Albrecht et al. | 360/103 |

FOREIGN PATENT DOCUMENTS

| | | |
|---|---|---|
| 0435495 | 7/1991 | European Pat. Off. . |
| 0442660 | 8/1991 | European Pat. Off. . |
| 59-148179 | 8/1984 | Japan . |
| 1-184755 | 7/1989 | Japan . |

OTHER PUBLICATIONS

IBM Technical Disc. Bulletin vol. 5 No. 2, Jul. 1962, W.G. Hopkins et al. "Air Bearing".

IBM Technical Disc. Bulletin vol. 19 No. 11, Apr. 1977, A.J. Bowen "Magnetic Recording Head Having Controlled Flying Height Above Flexible Media".

IBM Technical Disc. Bulletin vol. 20 No. 8, Jan. 1978, W. Hehl et al. "Spherical Multigroove Magnetic Head Design".

IBM Technical Disc. Bulletin vol. 27 No. 10A, Mar. 1985, H. Henkel et al. "Magnetic Disk Storage With Structured Head Slider".

Magnetic Recording Handbook:Technology and Applications Chapter 7, pp. 450–462 "Head Medium Interface" Frank E. Talke et al., McGraw–Hill Publishing Co., 1990.

*Primary Examiner*—Stuart S. Levy
*Assistant Examiner*—William R. Korzuch
*Attorney, Agent, or Firm*—Andrew J. Dillon

[57] ABSTRACT

The invention relates an improved slider with a controlled textured surface for information storage systems that use an incompressible fluid. Most preferably, the slider is a contact recording slider for a self-replenishment lubrication system for a disk drive of a computer. The controlled textured surface has a pattern that decreases the amount of lubricant lost due to out-of-plane flow while tracking during operation.

6 Claims, 3 Drawing Sheets

5,801,903

CONTACT RECORDING SLIDER FOR USE IN A LUBRICANT CONTAINING INFORMATION STORAGE SYSTEM

This is a continuation of application Ser. No. 07/998,103, filed 29 Dec. 1992, now abandoned.

BACKGROUND OF THE INVENTION

1. Technical Field

This invention relates generally to the slider component of an information storage system and, specifically, to an improved slider having a controlled textured surface which improves the performance and reliability of the system. Preferably, the slider is suspended on an incompressible fluid on the disk of a computer disk drive.

2. Description of the Related Art

In a disk drive or direct access storage device, the disk files are information storage devices with at least one rotatable disk storing information on concentric data tracks. A transducer reads information from or writes information to the various tracks on the data disk. The transducer attaches to a slider, forming the head. The slider attaches on its backside to the suspension. The suspension in turn connects to the actuator arm. The actuator arm positions and maintains the head over the desired track during read and write operations. These parts are assembled into the actuator.

In a traditional disk drive system using a compressible fluid, the rotation of the disk creates a cushion of air over the disk that allows the slider to lift off and float over the disk. The actuator arm suspension provides dimensional stability between the slider and the actuator arm by compensating for the force of the air between the slider's air bearing surface and the disk surface. The suspension controls slider flexibility relative to its direction of motion while resisting out-of-plane movement. This action keeps the slider close to the disk surface without allowing contact between them.

In a disk drive using an incompressible fluid system, an incompressible fluid replaces a compressible fluid. For instance, a liquid lubricant in a self-replenishment lubrication system replaces the air film in the air-bearing disk drive. The sliders do not float above the disk in this system, but are supported by the liquid. These sliders glide in a lubricant during track following, like a water skier gliding in a layer of water at high speed. There may be several milliliters of lubricant in such a disk drive.

During operation the slider pushes away extra lubricant in the out-of-plane direction perpendicular to slider motion and the pad actually rides on only a small layer of lubricant. With each pass of the slider during track following, some of the displaced lubricant is lost from the track. As in snowskiing, the amount of available lubricant diminishes after multiple runs or tracks over time. The quantity of lubricant actually available depends on the amount of initial lubricant and the amount of time passed. For an initial lubricant thickness of 70 to 100 Å, up to three quarters of the lubricant is displaced after several days of track following.

In order to understand the importance of the slider design and its influence on the current invention, it is necessary to study the dynamics of the slider movement in the disk lubricant during track following. The following theory and theoretical derivations describing slider movement in the lubricant follow the principles of fluid mechanics. These derivations show several factors and their effects on a slider during operation.

The ensuing lubrication theory from the prior art is based on the principle of using a compressible fluid such as air as a lubricant. The theoretical derivations rely on the classic Reynolds equation for air lubrication with the following assumptions: (1) gravitational and inertial forces are negligible, (2) the fluid is Newtonian and the flow is laminar, (3) the fluid viscosity is constant, (4) nonslip boundary conditions are obeyed at the walls, (5) the fluid-film thickness is much smaller than other typical bearing dimensions, (6) the surfaces are smooth, and (7) surface tension effects are negligible. The following is from the summary found in Mee, C. D. and Daniel, E. D., *Magnetic Recording Handbook*, 454–462 (1989).

One Reynolds equation derivation for a slider bearing is:

$$\frac{\partial}{\partial x} ph^3 \frac{\partial y}{\partial x} + \frac{\partial}{\partial y} ph^3 \frac{\partial p}{\partial y} = 6U\mu \frac{\partial PH}{\partial x} + 12\mu \frac{\partial ph}{\partial t} \quad (1)$$

where x,y=spatial coordinates t=time p and μ=pressure and viscosity h=lubricant thickness U=velocity of moving bearing surface.

A nondimensional form of the Reynold's equation uses the nondimensional length scales:

$$X = \frac{x}{B} \; ; Y = \frac{y}{L} \; ; H = \frac{h}{h_{min}}$$

where B, L and $h_{min}$ are the breadth, width and minimum spacing of the slider bearing. The nondimensional pressure and time scales are:

$$P = \frac{p}{p_a} \; ; T = \frac{t}{U/B}$$

where $p_a$ is the ambient pressure outside the bearing. Next, substitute the nondimensional scales into Equation 1 to obtain the following nondimensional form of the Reynold's equation $$\frac{\partial}{\partial X} PH^3 + \frac{B^2}{L^2} \frac{\partial}{\partial Y} PH^3 \frac{\partial P}{\partial Y} = \Lambda \frac{\partial PH}{\partial X} + \sigma \frac{\partial PH}{\partial T} \quad (2)$$

where B/L=slenderness ratio,

Λ=bearing number, and

σ=squeeze film number, defined by:

$$\Lambda = 6U\mu \frac{B}{p_a h_{min}^2}$$

$$\sigma = 12\mu\omega \frac{B^2}{p_a h_{min}^2}$$

where ω is an appropriate frequency.

The above form of the Reynolds equation 2 describes the pressure as a function of spacing in a compressible, time-dependent air bearing. Under steady conditions, the equation reduces to:

$$\frac{\partial}{\partial X} PH^3 \frac{\partial P}{\partial X} + \frac{B^2}{L^2} \frac{\partial}{\partial Y} PH^3 \frac{\partial P}{\partial Y} = \Lambda \frac{\partial PH}{\partial X} \quad (3)$$

Slider bearing design requires calculating the pressure distribution as a function of bearing design parameters. The pressure distribution in the fluid lubricant is a function of the spacing h. If one assumes the bearing is infinitely long (L=∞) under steady flow, one can solve for the pressure field. All other quantities needed for the design of the bearing, such as total load, pivot location, air flow and total frictional force derive from the pressure field solution. If the coordinates and velocity components are as shown in FIG. 3, the Reynolds equation reduces to $$\frac{\partial}{\partial X} PH^3 \frac{\partial P}{\partial X} = \Lambda \frac{\partial PH}{\partial X} \quad (4)$$

with boundary conditions
P=1 at X=0, 1.

For small bearing numbers, Equation 4 simplifies to the equation appropriate for incompressible fluids:

$$\frac{\partial}{\partial X} H^3 \frac{\partial P}{\partial X} = \frac{\partial H}{\partial X}$$

Defining the spacing variation in the fluid lubricant as:

$$H = 1 + K - KX \quad (5)$$

where $$K = \frac{h_L - h_{min}}{h_{min}} = H_L - 1 \quad (6)$$

Integrating Equation 5 twice with respect to X, and using the boundary conditions of Equation 4, one obtains the pressure distribution in a steady, infinitely long, incompressible bearing as:

$$P = 1 + \Lambda \frac{KX(1-X)}{(2+K)(1+K-KX)^2} \quad (7)$$

A plane inclined slider bearing in an incompressible fluid generates a pressure increase. The pressure increase is proportional to $\Lambda$, or equivalently, to the velocity U and the fluid viscosity $\mu$, and inversely proportional to the square of the minimum spacing $h_{min}$.

After calculating the pressure, the load per unit length is calculated from $$W^* = \frac{W}{p_0 LB} = \int_0^1 (P-1) dX \quad (8)$$

resulting in $$W^* = \frac{\Lambda}{K} \left[ \frac{\ln(1+K)}{K} - \frac{2}{2+K} \right] \quad (9)$$

The pivot position x at the zero moment point, is given by $$\bar{x} = \frac{1}{W} \int_0^L \int_0^b (p-p_0) x \, dy \, dx \quad (10)$$

resulting in $$\bar{X} = \frac{\bar{x}}{B} = \frac{2(3+K)(1+K)\ln(1+K) - K(6+5K)}{2K[(2+K)\ln(1+K) - 2K]} \quad (11)$$

Finally, the air flow per unit length is given by $$\frac{q_x}{L} = U h_{min} \frac{1+K}{2+K} \quad (12)$$

and the frictional force by $$F = \int_0^L \int_0^B \tau \, dy \, dx = \frac{LB\mu U}{h_{min}} \left[ \frac{4\ln(1+K)}{K} - \frac{6}{2+K} \right] \quad (13)$$

As the bearing number increases, the left side of Equation 4 decreases compared with the right side. With an infinitely large bearing number $\Lambda$, this equation reduces to $$\frac{\partial PH}{\partial X} = 0 \quad (14)$$

Equation 14 is only a first-order differential equation, compared with the Reynolds equation, which is second-order. Therefore, only one boundary condition can be satisfied. Integrating this equation with the boundary condition P=1 and X=0, then $$P = \frac{H_1}{K+1-KX} \quad (15)$$

and the pressure distribution for large bearing numbers is independent of velocity and fluid viscosity. The load-carrying capacity is also independent of velocity or fluid viscosity as given by $$W^* = \frac{K+1}{K} \ln(K+1) - 1 \quad (16)$$

The variation of load for an infinitely long, plane slider bearing is a function of the bearing number for several values of $H_L$, where $H_L = h_L/h_{min}$. The load is proportional to the bearing number in an incompressible, small, bearing number region and independent of the bearing number in a compressible, infinitely large, bearing number region.

For a typical prior art air slider bearing in a magnetic disk file, the bearing number is on the order of 100, assuming a typical breadth of 5 mm, a flying height of 1 µm, and air with a viscosity of $1.8 \times 10^{-5}$ Pa-s. The typical prior art slider bearing is neither incompressible nor infinitely large. The dependence of the load-carrying capability on the bearing number is modified by the length of the bearing. Short bearings experience side flow with a decrease in pressure.

A closed-form solution of the compressible Reynolds Equation 4, for the case of the infinitely long, plane slider bearing replaces dP/dX by dP/dH dH/dX, and adds a new dependent variable $\psi = PH$. Separating variables, integrating, and rearranging, one obtains a solution $$\psi^2 - \frac{\Lambda}{H_L - 1} \psi + C_1 = C_2 H^2 f(\psi) \quad (17)$$

The function $f(\psi)$ is complicated with different forms depending on the value of the bearing number $\Lambda$. Constants $c_1$ and $c_2$ must be determined at the boundary conditions. Solving this equation for K=1 and pressure as a function of the position in the breadth direction, $\Lambda \to \infty$ for infinitely large bearing numbers, while $\Lambda \to 0$ for the small bearing number limit.

When the spacing between the slider and the disk decreases to the submicrometer levels such as near contact recording, information storage systems, the Knudsen number (the ratio of mean free path to bearing separation) reaches a value of the order of 0.1 or larger. Under these conditions, the air film deviates from continuum-flow assumptions, allowing slip boundary conditions at the walls. Slip implies that the velocity gradient in the air film has decreased. The apparent viscosity of the air diminishes along with the load-carrying capacity of the slider.

From the kinetic theory of gases, gas viscosity tends toward uniformity of mass velocity due to the motion of the molecular motion from one point to the next. Momentum and energy are transported and the conditions at the beginning and end of each free molecular path equalize. At sufficiently low pressures, the mean free path of molecules becomes comparable to the physical dimensions of the system, and the transport of momentum is no longer a free-path phenomenon.

An air slider bearing at very close spacing encounters a similar situation. The mean free path becomes a significant portion of the dimensions.

If the gas departs only slightly from the ideal state, the approximate expressions for viscosity are still obtainable using classical kinetic theory. Assuming flow between parallel flat plates one of which is moving with velocity U, and considering the momentum exchange of molecules at the walls, the gas near a wall slips relative to the wall with a speed $$k\lambda \left( \frac{2-\theta}{\theta} \right) \frac{\partial u}{\partial z}$$

where $\theta$ is the fraction of molecules entering the wall, $2-\theta$ is the portion of molecules that is reflected specularly, k is a numerical factor on the order of 1, $\lambda$ is the mean free path, and $\partial u/\partial z$ is the velocity gradient of the gas. When applied to an air slider bearing, one obtains the Reynolds equation modified for boundary slip, $$\frac{\partial}{\partial X} \left[ PH^3 \frac{\partial P}{\partial X} + \frac{\partial}{\partial Y} \left( 1 + \frac{6K_m}{PH} \right) \right] = \Lambda \frac{\partial}{\partial X} PH + \sigma \frac{\partial P}{\partial T} \quad (18)$$

where $K_\infty = \lambda/h_{min}$ is the Knudsen number based on the ambient mean free path and minimum spacing.

If one plots the pressure distribution in a plane slider with a minimum slider-disk spacing of 0.2 μm, a substantial reduction in the pressure occurs due to slip.

The derivation of the slip-flow boundary condition is only for the case of pure shear flow between parallel plates. In the case of a slider bearing, the slider moves at a pitch angle α. Therefore, the flow is not the same as two parallel plates and strong pressure exists. Therefore, the slip-flow boundary conditions must be applied with caution.

The lubrication theory discussed above can be used to demonstrate the advantages to be gained through the use of the improved slider design of the invention. Specifically, the improved design of the invention as described in the Detailed Description, when used with an incompressible fluid lubricant system, provides significant advantage over prior art, air film disk drives. Air film disk drives have many problems. One problem concerns the abrasion of the disk that leads to disk drive failure.

One object of the invention is to reduce the tendency of the contact recording slider to force the lubricant to flow perpendicular to the direction of travel and thinning the lubricant during track following.

Another related object of the invention is to improve the ability of the slider to continually ski on the lubricant.

SUMMARY OF THE INVENTION

The invention relates to an improved slider for information storage systems that use incompressible fluids. The slider has a face region that faces the information storage medium and the incompressible fluid during operation of the information storage system. The face region has a length, a width, two opposite sides extending across the length and two opposite ends extending across the width, and perpendicular to the sides. The slider has at least one end with a partially controlled, textured surface.

The partially controlled, textured surface is preferably on bearing pads located at least partially within the trailing end and the opposite leading end of the slider's face region. The bearing pad's controlled textured surface may form a pattern of uniform ridges and grooves with an amplitude between about 20 to 50 nm and spacing between ridges at about 100 to 500 nm. The slider is preferably a skiing slider for use within a lubricated computer disk drive.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

Figure 1:
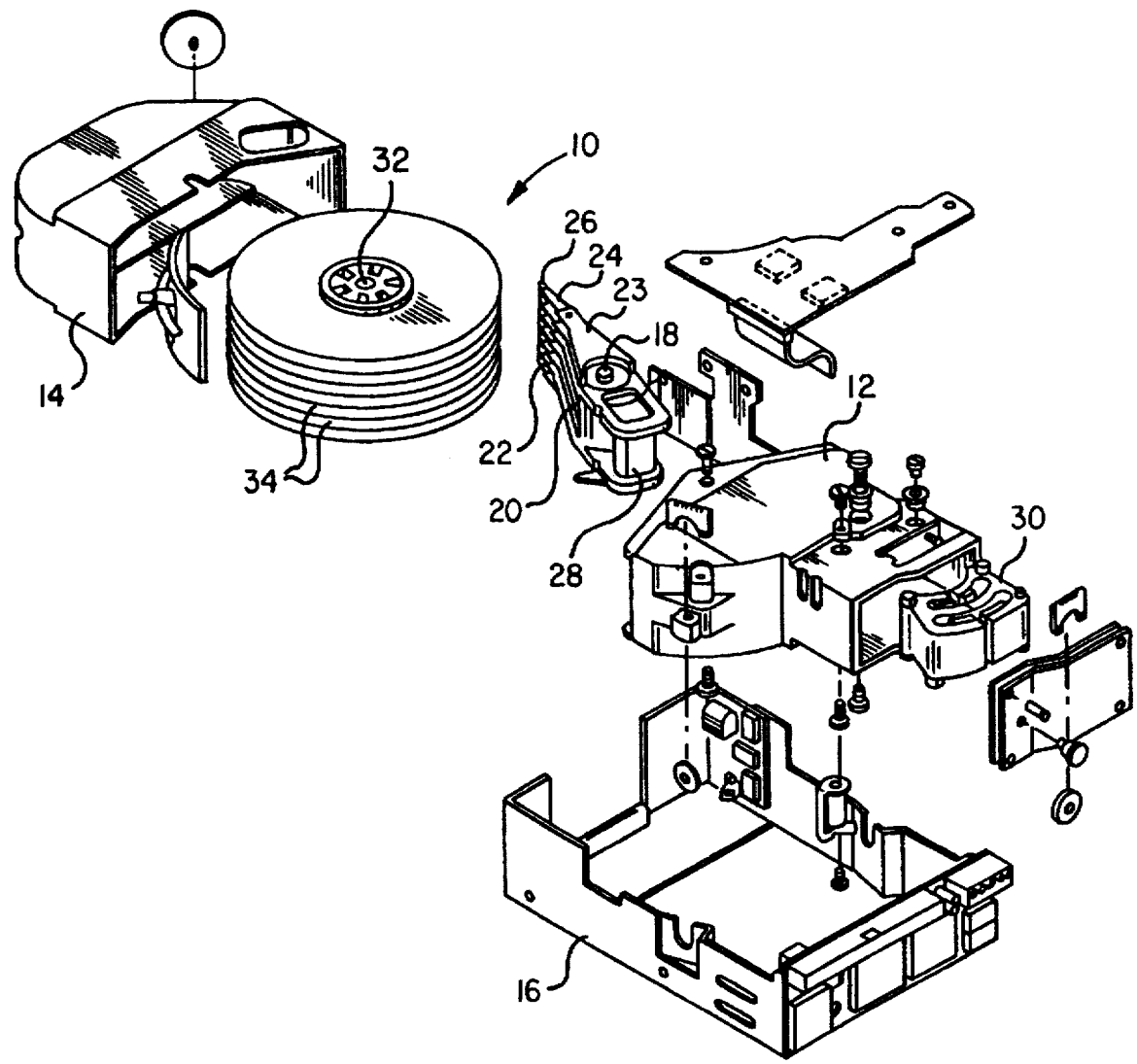
FIG. 1 is an exploded view of a disk drive or direct access storage in which the invention could be used.

These drawings are not intended as a definition of the invention but are provided solely for the purpose of illustrating the preferred embodiments of the invention described below.

DETAILED DESCRIPTION OF THE INVENTION

The invention describes a slider for use in an information storage system that uses an incompressible fluid. Since the slider is supported on the lubricant or incompressible fluid, it is a near contact type slider. Preferably, the incompressible fluid system is a self-replenishment lubrication system for computer disk drives. In this disclosure, the terms "incompressible fluid" and "lubricant" are interchangeable.

The slider has a face region that faces the information storage medium and the incompressible fluid during operation of the information storage system. The face region is defined by a length, a width, two opposite sides extending across the length and two opposite ends extending across the width.

The following is a brief outline of a fluid mechanical analysis for lift and maximum pressure completed on a contact recording slider with bearing pads as described in the background. See, Mee, C. D. and Daniel, E. D., *Magnetic Recording Handbook*, 454–462, (1989). Substituting the values for $\Lambda$ and K in the derivation of the incompressible Reynolds equation, Eq. 9, for a plane slider bearing on a Newtonian, incompressible fluid to the terminal trailing end, W, of the slider, traveling at some pitch angle, α, the lift of the bearing pad can be written as:

$$W = \frac{6\mu ULB}{\alpha} \left[ \frac{\ln\left(\frac{h_L}{h_L - \alpha B}\right)}{\alpha B} - \frac{2}{2h_L + \alpha B} \right] \quad (19)$$

where μ equals the absolute lubricant viscosity, U equals the linear velocity, $h_L$ equals the lubricant thickness, B equals the breadth of the rear bearing pad in contact with the lubricant, and L equals the bearing pad width. Id.

The maximum pressure P under the slider is approximately:

$$P = \frac{6\mu U B^2 \alpha}{(2h_1 - \alpha B)^3} \quad (20)$$

Id.

The angle of attack or pitch of the rear bearing pad of the slider, α, $h_L$ and B are three unknowns in the model problem. By assuming:

1) the rear end of the rear bearing pad to be square and α=300 μrad,
2) the normal load supported by the trailing end, W, to be on the order of 2 g,
3) the rear bearing pad width L is 100 μm,
4) an absolute lubricant viscosity μ of $10^{-2}$ Pa-s, and
5), a linear velocity U of 10 m/s, one obtains the result that B=1 μm for a lubricant thickness $h_L$ of 50 Å. If the lubricant thickness is reduced to 20 Å, the length of the slider in the lubricant reduces to 0.5 μm. Thus, only a very small portion of the trailing end "skis" in the lubricant. This analysis assumes, of course, that the slider surface and disk surface are infinitely rigid.

The pressures associated with the above conditions range from 200–800 MPa. Thus, a very large pressure gradient exists perpendicular to the direction of slider motion (out-of-plane flow). This gradient is responsible for the lubricant depletion under the slider.

The slider of the invention has at least one controlled textured end. Preferably, the slider has a trailing end with a controlled textured surface and/or a textured bearing pad on the trailing end. During operation, the trailing end of the slider is supported by the information storage medium, for instance, a disk in a disk drive. The trailing end is the part of the slider closest to the information storage medium during operation. In an incompressible fluid system, the trailing end is supported by the fluid. In a self-replenishment lubrication system, the trailing end skis in the lubricant. A contact recording slider with a trailing end bearing pad having a controlled, textured surface is most preferred.

The slider of the invention has a leading end opposite to the trailing end. Preferably, the slider has two bearing pads on its leading end. The bearing pads on the leading end may be textured in a manner similar to the trailing end bearing pad. Controlled textured front bearing pads are preferred.

The controlled textured surface of the invention's slider has a roughness that is by design and is deliberately generated before or after forming the slider. All sliders have some random roughness after manufacturing. To produce a uniform and smoother textured surface, sliders are lapped or polished, often using some type of abrasive. Sliders are further treated, such as sputter or acid etched or plated, to texture their surfaces.

For the slider of the invention, the controlled textured surface can be textured after the initial smoothing or lapping, using any abrasive technique known to the industry. For example, abrasive lapping with 100 μm diamond paste, sputter etching, or masking a pattern then etching. If the texturing is done before carbon sputtering and the etching of the rails, the controlled textured surface should be protected, preferably by masking.

A controlled textured surface having a pattern is preferred. The controlled textured surface forms a pattern of roughness extending lengthwise across the width of the face region of the slider. Most preferably, the pattern has regular intervals and heights. The controlled textured surface may have peaks and valleys, ridges and grooves, lands and grooves, saw-toothed or shark-toothed patterns, and the like. Although no exact dimensions are currently preferred, an amplitude or height of about 20 to 50 nm with a peak-to-peak spacing of about 100 to 500 nm is appropriate. There are currently no preferred lengths of valleys or grooves.

For the purposes of the present invention, the slider is made with any material used to make sliders, for example, ceramics, such as a mixture of alumina and titanium carbide, polycrystalline two phase material or spinel type ferrites. The slider may incorporate many physical features, for instance, bearing pads, rails, etched surfaces, grooved surfaces, and combinations thereof. Slider bearing pads, either alone or in combination with other physical features, are preferred. The slider may be used in any type of information storage system that utilizes an incompressible fluid, although the self-replenishment lubrication system is preferred.

The invention described in this application is useful with information storage systems, for example, disk drives or direct access storage devices. FIG. 1 is an exploded view of an example of an information storage system. It should be noted that although a rotary actuator is shown, the invention described herein is applicable to linear actuators. The disk drive 10 includes a housing 12, and a housing cover 14 which, after assembly, is mounted within a frame 16. Rotatably attached within the housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22, are load springs 24. Attached at the end of each load spring is a slider 26 which carries a pair of magnetic transducers or the head. On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator arm assembly 20 to rotate it about the actuator shaft 18. Also mounted within the housing 12 is a spindle shaft 32. Rotatably attached to the spindle shaft 32 are rotating media 34. In FIG. 1, eight disks are attached to the spindle shaft 32. As shown in FIG. 1, the rotating media 34 are attached to the spindle shaft 32 in spaced apart relation. An internal motor (not shown) rotates the disks 34.

Figure 2:
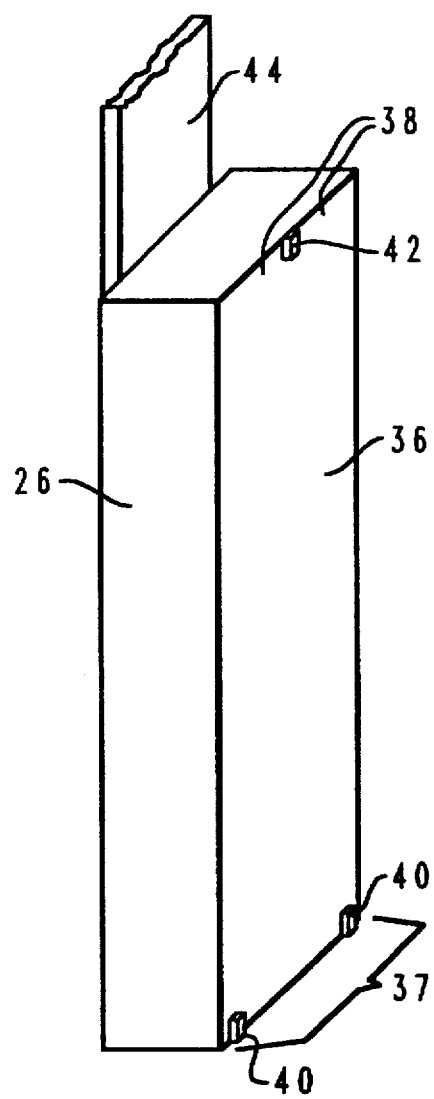
FIG. 2 is a schematic view of a head suspension assembly with a slider attached to the suspension of the actuator arm.

FIG. 2 portrays one type of slider 26 of the invention. The slider has a face region 36 that faces the information storage medium, such as a disk, and the lubricant during operation and lies in the lubricant at rest. A leading end 37 crosses the face region 36 at one end. A trailing end 38 extends across the face region 36 at the end opposite the leading end 37. Bearing pads 40, 42 extend from the face region 36. Two front bearing pads 40 lie on the leading end 37. A rear bearing pad 42 lies within the trailing end 38. The slider attaches to a load beam 44.

Figure 3:
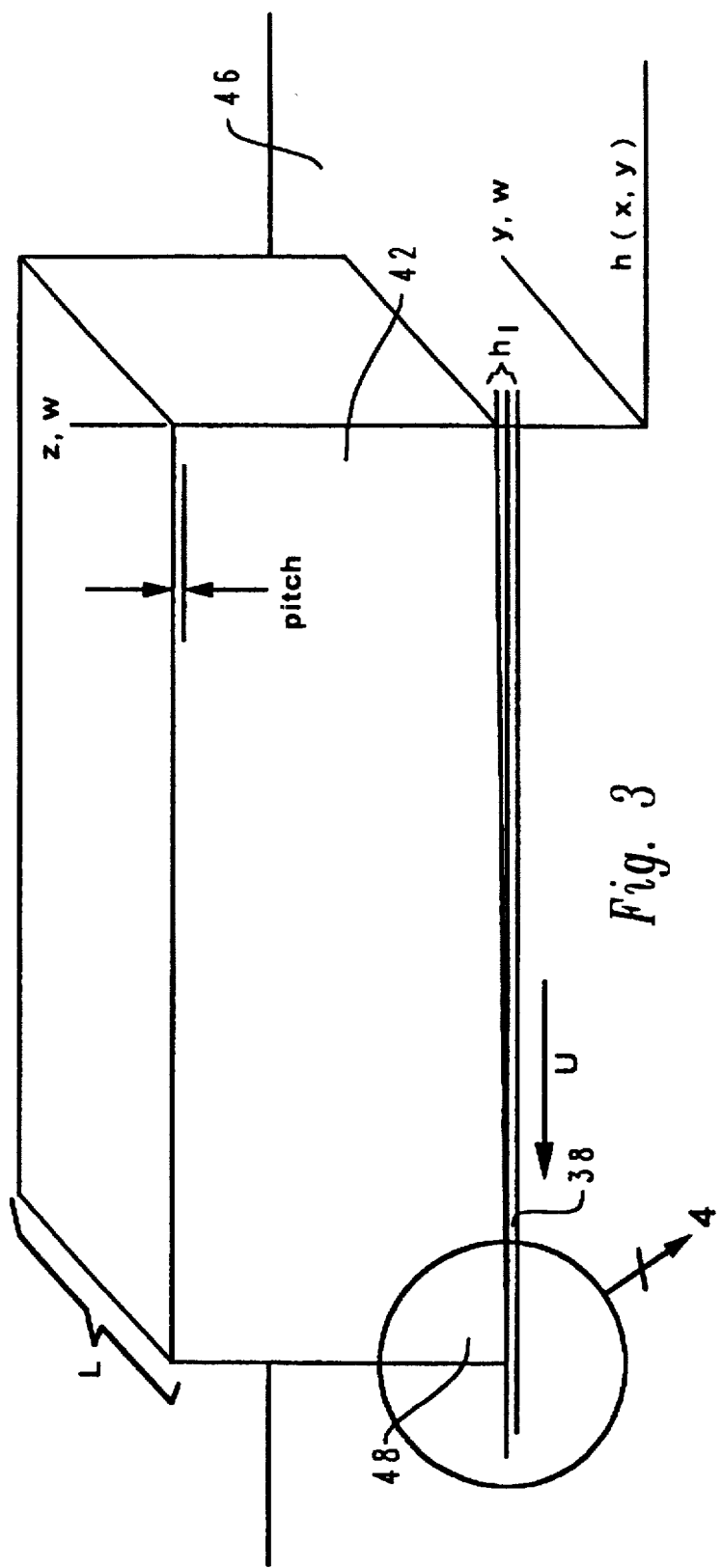
FIG. 3 is a close-up side view of a trailing end bearing pad resting in lubricant during operation.

FIG. 3 demonstrates a rear bearing pad 42 of a slider during operation of the information storage system. The posterior portion of the rear bearing pad 42 skis in the lubricant 46 at a pitch. This small portion of the slider is the actual trailing end 38.

Figure 4:
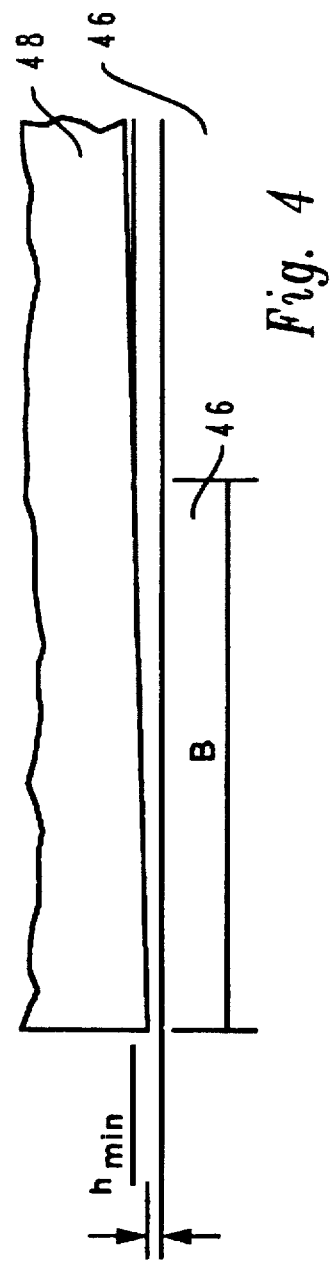
FIG. 4 is a close-up side view of the posterior portion of trailing end bearing pad in lubricant during operation.

FIG. 4 further demonstrates the posterior portion of the rear bearing pad 42 shown in FIG. 3 skiing in lubricant 46. The arrows show the minimum height of the lubricant 46.

Figure 5:
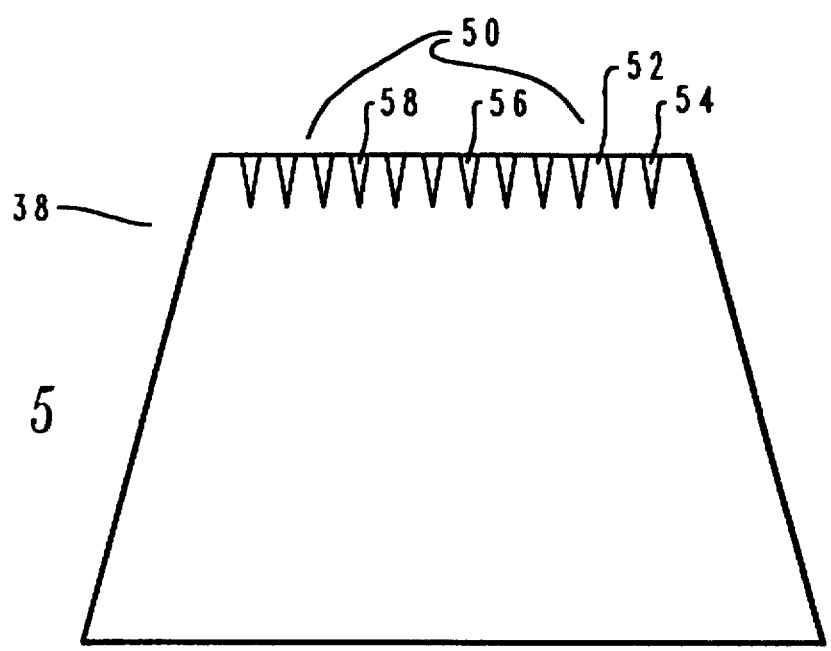
FIG. 5 is a view of a textured bearing pad in one of the configurations of the invention.

FIG. 5 illustrates a preferred controlled textured, pattern 50 of the invention. A controlled textured, rear bearing pad 42 of a slider has a textured surface on the trailing end 38 in a shark toothed pattern 50 across the width, with each "tooth" representing a groove 54, 58. This textured surface also has a pattern 50 of ridges 52 and grooves 54, 58, with a 100 nm spacing between the ridges. The grooves 54, 58 extend lengthwise from the slider end 56 forming a triangular shape, with the base of the triangle at the slider end 56. The length of the grooves 54 from the slider end S6 is not critical.

An invention has been provided with advantages. A slider with the textured surface of the invention reduces the tendency to drive the lubricant in an out-of-plane direction (perpendicular to the direction of travel). The high pressure gradient under the slider determines the rate of the lubricant driven in the out-of-plane direction. If the slider successfully maintains tracking to a very high degree of accuracy, a series of ridges should form in the lubricant due to the out-of-plane flow from the controlled textured surface. For some amount of non-repeatable runout a continuous shuffling of the lubricant takes place. For a skiing slider with a bearing pad, the length of the fluid driven in the out-of-plane flow depends on the ridge spacing, rather than the width of the bearing pad.

Reducing the length of fluid in the out-of-plane flow diminishes lubricant thinning. First, the settling time of the ridges formed in the lubricant during tracking should decrease. Second, reflow may sufficiently reduce the ridges between passes. Third and most significant, asynchronous motions between passes of the slider during operation may eliminate gross lubrication movements. In other words, continuous track following merely shuffles the lubricant under the slider, rather than creating a net outward migration over time.

While the invention has been particularly shown and described with reference to a preferred embodiment, it will be understood by those skilled in the art that various changes in form and detail may be made therein without departing from the spirit and scope of the invention.

What is claimed is:

1. An improved slider for an information storage system having an information storage medium including an exposed surface at least partly covered with an incompressible fluid, the improved slider comprising:

a face region which is exposed to the incompressible fluid located on the exposed surface of the information storage medium during operation of the information storage system, the face region having a length, a width, a pair of opposing sides extending across the length of the face region, two opposite ends which extend across the width of the face region and perpendicular to the opposing sides;

at least one of the opposite ends having a partially controlled, textured surface with a patterned roughness extending lengthwise across the width of the face region; and at least one bearing pad having a length and a width and located at least partially within at least one end and having at least a partially controlled, textured surface with a patterned roughness comprising a plurality of triangle shaped grooves extending lengthwise across substantially the entire width of the bearing pad each of said triangle shaped grooves having a vertex extending into said bearing pad.

2. The slider of claim 1 further comprising the second of the opposite ends having a partially controlled, textured surface with a patterned roughness extending lengthwise across substantially the entire width of the face region.

3. The slider of claim 1, wherein the slider is for a self-replenishment lubrication system.

4. The slider of claim 1, wherein the textured surface has an amplitude between about 20 to 50 nm.

5. An improved slider for an information storage system having an information storage medium including an exposed surface at least partly covered with an incompressible fluid, the improved slider comprising:

a face region which is exposed to the incompressible fluid located on the exposed surface of the information storage medium during operation of the information storage system, the face region having a length, a width, a pair of opposing sides extending across the length of the face region, a trailing end extending across the width of the face region and perpendicular to the opposing sides, and an opposite leading end extending across the width of the face region and perpendicular to the opposing sides;

a selected one of the trailing end and the leading end having a partially controlled, textured surface with a patterned roughness extending lengthwise across the width of the face region; and at least one bearing pad having a length and a width and located at least partially within the selected one of the trailing end and leading end, and having at least a partially controlled, textured surface with a patterned roughness comprising a plurality of triangle shaped grooves extending lengthwise across substantially the entire width of the bearing pad each of said triangle shaped grooves having a vertex extending into said bearing pad.

6. The slider of claim 5, wherein the slider is for a self-replenishment lubrication system.

* * * * *

UNITED STATES PATENT AND TRADEMARK OFFICE
CERTIFICATE OF CORRRECTION

PATENT NO. : 5,801,903
DATED : September 1, 1998
INVENTOR(S) : Meyer It is certified that error appears in the above-identified patent and that said Letters Patent is hereby corrected as shown below:

On the title page, add the following in item [56]:

FOREIGN PATENT OR PUBLISHED FOREIGN PATENT APPLICATION

|  |  | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
|  |  | 2 | 1 | 7 | 3 | 9 | 8 | 8 | 07/05/90 | Japan |  |  |  |  |
|  |  |  |  |  |  |  |  |  |  |  |  |  |  |  |

Signed and Sealed this

Sixth Day of April, 1999

Attest:

Attesting Officer

Q. TODD DICKINSON

Acting Commissioner of Patents and Trademarks